United States Patent [19]

Nakahama

[11] 4,054,052
[45] Oct. 18, 1977

[54] AIRCRAFT INSTRUMENT WITH ACCELERATION COMPENSATION DEVICE

[75] Inventor: Kazushi Nakahama, Komae, Japan

[73] Assignee: Tokyo Aircraft Instrument, Co., Ltd., Tokyo, Japan

[21] Appl. No.: 675,145

[22] Filed: Apr. 8, 1976

[30] Foreign Application Priority Data

Mar. 9, 1976 Japan .................................. 51-25889

[51] Int. Cl.² ............................................ G01D 11/10
[52] U.S. Cl. ................................ 73/430; 73/DIG. 10
[58] Field of Search ..................... 73/430, 432 A, 496, 73/DIG. 10

[56] References Cited

U.S. PATENT DOCUMENTS

| | | | |
|---|---|---|---|
| 2,365,806 | 12/1944 | Dewan | 73/430 |
| 2,811,619 | 10/1957 | Bourns et al. | 73/430 X |
| 2,921,279 | 1/1960 | Cosby et al. | 73/DIG. 10 X |
| 2,926,899 | 3/1960 | Gaubatz | 73/DIG. 10 X |
| 3,576,605 | 4/1971 | Drake et al. | 73/423 A X |

Primary Examiner—Richard C. Queisser
Assistant Examiner—John S. Appleman
Attorney, Agent, or Firm—Oblon, Fisher, Spivak, McClelland & Maier

[57] ABSTRACT

An aircraft instrument with an acceleration compensation device comprises at least a capsule, a rocking axle, a link mechanism to transmit displacements of a free end of the capsule to the rocking axle, a first gear integrally provided with the rocking axle, a second gear meshed with the first gear and being rotatable, and weights. The weights are provided on the first gear and the second gear each correspondingly, and rotative force of the weights caused by an acceleration force works on the rocking axle so as to cancel the rotative force of the rocking axle by the displacements, due to the acceleration, of the free end of the capsule.

8 Claims, 7 Drawing Figures

AIRCRAFT INSTRUMENT WITH ACCELERATION COMPENSATION DEVICE

The present invention relates to aircraft instruments using capsule(s), and more particularly to aircraft instruments having an acceleration compensating device for compensating an error generated by an acceleration force added to the instruments.

Heretofore, aircraft instruments with capsule(s) have been provided in which axial displacement of the capsule(s) due to the pressure difference between the inside and outside of the capsule(s) is amplified with a link mechanism, whereby various indications, such as of altitude, rate of climbing, velocity, are made or switches are controlled.

When an acceleration force is exerted to the instruments, there are generated displacements other than that by the above-mentioned pressure differences. Therefore various compensating devices for preventing displacements by such acceleration force have been proposed and used.

In general, when an acceleration force is exerted to such aircraft instruments, the position of the free end of the capsule or capsule assembly tends to displace, which displacement varies between that occuring by an acceleration force of the axial direction of the capsule(s) (hereinafter referred to as Y direction) and that of the direction crossing at right angles with the axis of the capsule(s) (hereinafter referred to as X-direction). In the conventional aircraft instruments with capsule(s), compensation of the displacements in the Y direction has been proposed, but compensation with respect to the X-direction has not been sufficient and has been accompanied with various problems with respect to the compensating mechanism.

An explanation is hereinafter given of a conventional and typical aircraft instrument with capsules together on its compensating mechanism in order to point out the problems in such mechanisms. For this purpose, three figures are used, in which FIG. 1 is a back view of a conventional aircraft instrument, and FIG. 2 is a bottom view thereof. In these figures, an indicating plate, not shown, of the instrument is taken as its front. In the instrument shown, the numeral 3 shows a stud fixed to a frame structure provided in the casing, not shown, of the instrument, to which stud 3 is connected a first capsule 1. To the first capsule 1 is connected a second capsule 2 through a spacing member 4. To a center of the second capsule 2 is mounted a member 5 to which a pin 5a is provided. The pin 5a moves up and down in accordance with the axial displacements of the capsules. The pin 5a is engaged with a slot 6a of a link member 6, so that the movement of the pin 5a is transmitted to a rocking axle or a rotating axle 10 through the link member 6. The rocking axle 10 is pivoted to the frame structure, and the axle 10 is connected to the link member 6 through a pin 7 provided on a first arm 8 fixed thereto. To the axle 10 is further provided a sector gear 15 through which the displacement of the capsules is transmitted to indicating pointer(s), of the instrument, now shown.

A balance member 12 of considerable mass is connected to stud 14 fixedly mounted to the frame structure through a leaf spring 13. The balance member 12 is connected to a second arm 9 of the axle 10 through a link member 11.

With the aircraft instrument of the above construction, when the pin 5a moves downward in the drawing due to the acceleration force, the balance member 12 also tends to move downward, thus both displacement forces being transmitted to the axle 10 as a rotating force cancelled with each other. Accordingly, the axle 10 does not rotate by the acceleration force. It will be realized that acceleration compensation in the Y direction is thus made.

However, with this compensating mechanism, the leaf spring 13 connected between the balance member 12 and the stud 14 is liable to be fatigued due to the considerable mass or inertia of the balance member 12. Since the acceleration force is exerted not only from the Y direction but from other various directions, which results in that the leaf spring 13 is likely to receive complicated forces from various directions, in an extreme case it may be injured or cracked with such forces.

FIG. 3 diagrammatically shows another conventional aircraft instrument. In this instrument, two pairs of capsules 16 and 17 are disposed opposingly to each other, the displacement of each free end of these pairs of capsules are transmitted to a rocking axle 18 through respective link members.

When the pairs of capsules are to move at each free end by the acceleration force of the Y-direction, the rotative force by the displacement direction becomes opposite to each other between the pairs with respect to the axle 18, thus not generating any acceleration error. With this construction, the problem seen in the leaf spring 13 of FIGS. 1 and 2 may be removed, but it provides another problem in that it necessitates use of additional expensive capsules.

Accordingly, one of the objects of the present invention is to provide a reliable aircraft instrument having a novel acceleration compensating device.

Another object of the present invention is to provide a reliable aircraft instrument having an acceleration compensating device in which compensation both in the Y- and X-directions is sufficiently made.

Still another object of the present invention is to provide an aircraft instrument having an acceleration compensating device in which the adjustment of both directions is made independently.

For these purposes, the aircraft instrument with an acceleration compensating device according to the present invention includes at least one capsule, a rocking axle, a link mechanism for transmitting the displacement of a free end of the capsule to the rocking axle, a first gear integrally provided with the rocking axle, a second gear meshed and rotatable with the first gear, and weights provided respectively and correspondingly on the first and the second gears, and the displacements of the capsules at the free end generated by the acceleration force exerted thereto are cancelled at the rocking axle by the rotating force of the weights caused by the acceleration force. With this construction, the instrument becomes more reliable and displacements of the X- and Y-directions may be compensated independently, thus the objects of the invention may be achieved completely.

The above and other objects and advantages of the invention will appear more fully hereinafter from the detailed description, taken together with the accompanying drawings, in which.

Figure 4:
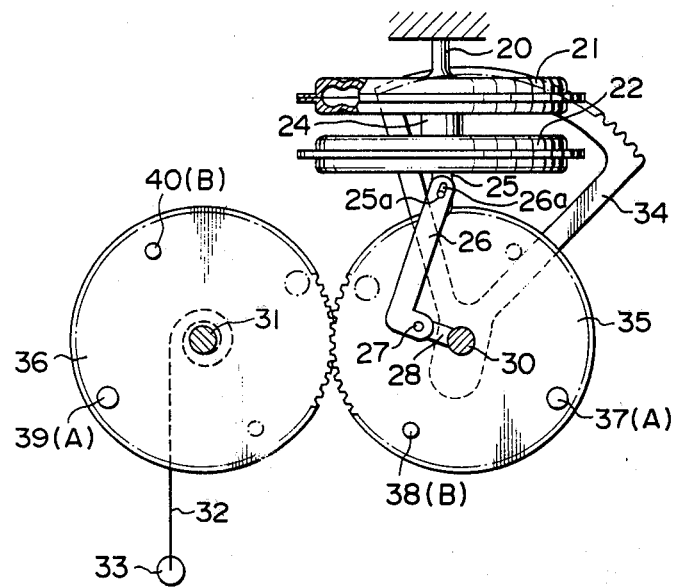
FIG. 4 is a back view of the aircraft instrument according to the present invention.
Figure 5:
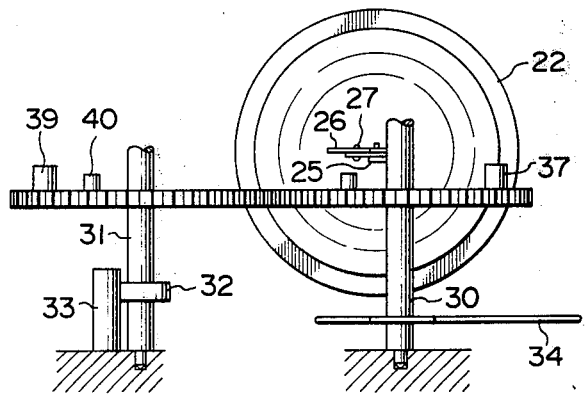
FIG. 5 is a bottom view of the instrument of FIG. 4.

In FIGS. 4 and 5, a stud 20 is fixed to frame structure provided in a casing, not shown, of the instrument, to which stud 20 is fixed a first capsule 21. To the first capsule 21 is connected a second capsule 22 through a spacing member 24. At a center of the second capsule 22 is provided a member 25 on which there is planted a pin 25a. The pin 25a moves up and down according to the displacement of the capsules. The pin 25a is engaged with a slot 26a formed in a link member 26 and its amount of displacement is transmitted to a rocking or rotating axle 30.

Figure 1:
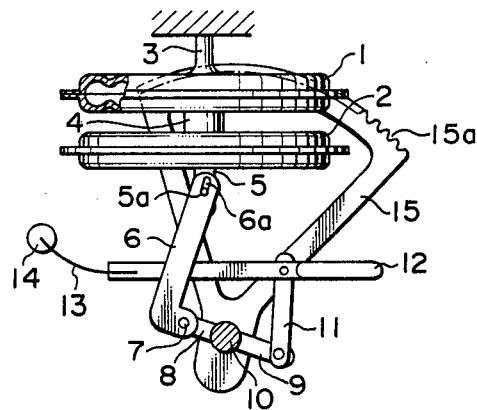
FIG. 1 is a back view of a conventional aircraft instrument using capsules.
Figure 2:
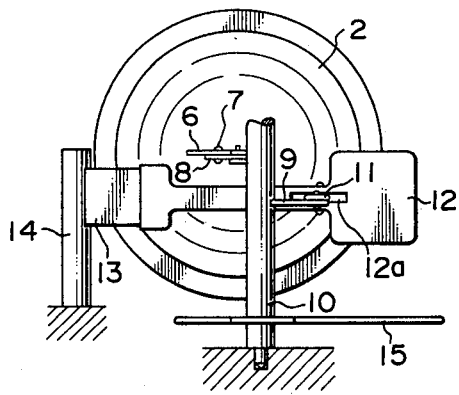
FIG. 2 is a bottom view of the instrument of FIG. 1.
Figure 3:
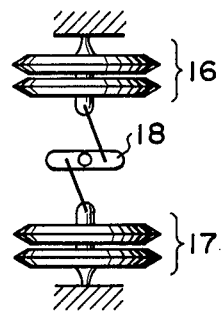
FIG. 3 is a view showing another conventional aircraft instrument with capsules.

To the rocking axle 30 are pivoted a sector gear 34, a gear 35 and an arm 28 in that order, wherein the sector gear 34 has similar function as the sector gear 15 mentioned in relation to FIGS. 1 and 2. The link member 26 is connected to the arm 28 at a pin 27.

With the gear 35 is meshed another gear 36 of the same size, which is fixed at an axle 31. On the gears 35 and 36 meshed with each other are provided weights 37(A), 39(A), and 38(B) 40(B) as the respective pairs. The pairs of weights are for compensating against the acceleration force of the Y- and X-directions, respectively, whose positions and masses will be explained later.

To the axle 31 of the gear 36 is fixed one end of a hairspring 32, and the other end thereof is fixed to a fixing pin 33. The hairspring 32 applies counterclockwise rotating force to the gear 36 and clockwise rotating force to the gear 35 meshed with the gear 36, so that the link member 26 is urged to the direction of the capsule 22 and therefore the pin 25a at the free end of the capsules is kept to contact usually at the lower-most end of the slot 26a.

Explanation will then be given, in detail, on the relation of disposition of the respective weights and way of acceleration compensation thereby, when the instrument is used as an altimeter.

As will be described later, the pair A of weights 37 and 39 are used for compensating the error of the Y-direction, wherein the compensation of the X-direction is not influenced. On the other hand, the weights B of 38 and 40 are for compensating only the X-direction, in which the Y-direction compensation is not influenced.

In place of the pairs of weights, i.e., the positive weights, negative weights in the form of openings may be used. The openings are provided in such case, as is shown in FIG. 4 with chain lines, at the positions spot symmetrical to the above mentioned positive weights with respect to the respective rotating axles 30 and 31. It will be realized that these negative weights can lessen the number of parts of the instrument, compared with the case of the positive weights.

For the convenience of explanation, we will give an explanation on the positive weights. It will be seen that same compensation is possible in the case of negative weights, on which explanation is eliminated.

Explanation will be given independently first on the Y-direction and later on the X-direction.

COMPENSATION OF THE Y-DIRECTION

Figure 6:
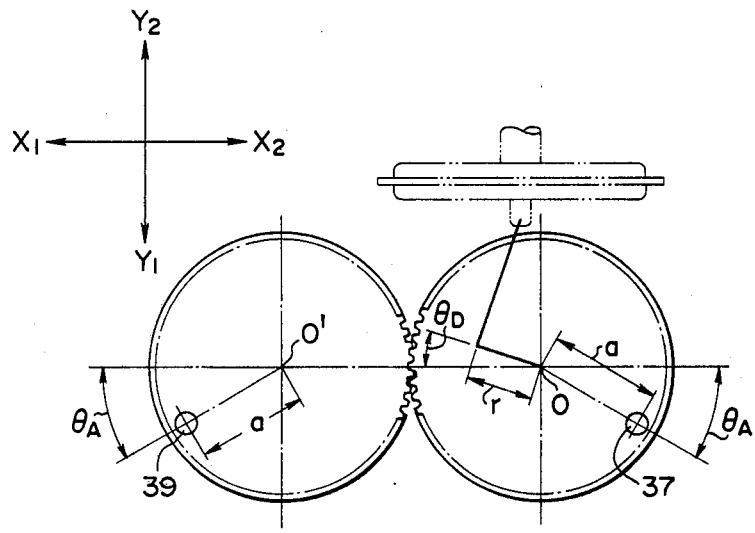
FIG. 6 is a view explaining the acceleration compensation in the Y-direction by the present invention.

FIG. 6 is a view explaining the pair of weights A, namely the compensation of the Y-direction. For the convenience of explanation the extending direction of the capsules is taken as $Y_1$, its reverse direction $Y_2$, and the X-direction is distinguished as $X_1$ direction and its reverse as $X_2$ direction.

FIG. 6 shows an initial state wherein the altitude is zero; the atmospheric pressure is of standard level; and the acceleration direction of gravity is the $Y_1$ direction.

Distance from the center of mass of the weight 37 to the rotation center of the gear 35 and that from the center of mass of the weight 39 to the rotating center of the gear 37 are set as $a$. The mass of the respective weights 37 and 39 is set as M. Angle between the weight 37 and $X_2$ axis and between the weight 39 and the $X_1$ axis is set as $\theta_A$.

When the point of operation for the force from the free end of capsules is at the distance $r$ from the point 0 and at the angle of $\theta_D$ with the $X_1$ axis, and if its application force is $W_Y(g)$, since the $W_Y$ is a function of $g$ ($g$ is acceleration of gravity), relation therebetween is given with the following equation: In this state the indication of the pointer, not shown, is adjusted to 0.

$$rW_Y(g)\cos\theta_D = 2aMg\cos\theta_A \tag{1}$$

where $g$ denotes acceleration due to gravity.

Under this initial state, when an acceleration force $\alpha$ is applied to the $X_2$ direction, the weight 37 exerts a clockwise rotative force of $M \cdot \alpha \cdot \sin\theta_A$ and the weight 39 a clockwise rotative force of $M \cdot \alpha \cdot \sin\theta_A$ with respect to the center O′, namely with respect to the center O a counterclockwise rotative force of $M \cdot \alpha \cdot \sin\theta_A$. It will be realized that there will not be any influence exerted to the rotation of the axle. In other words, the pair of the weights A work for the compensation of the Y-direction without exerting any influence on the error of the X-direction.

Explanation is now given at a certain altitude. When the capsules extend from the initial state until the gear 35 is rotated for the angle $\theta$, the equation (1) would be:

$$rW_Y(g)\cos(\theta_D-\theta) = 2aMg\cos(\theta_A-\theta) \tag{2}$$

In the above equation the left side shows a force from the capsules at the altitude, while the right side a force by the weight, thus both forces being balanced with each other.

When the value of $W_Y(g)$ may be considered constant regardless of altitude, the equation $\theta_D = \theta_A$ may be given and accordingly the following relation is seen:

$$rW_Y(g) = 2aMg \tag{3}$$

It is experimentally known that the value of $W_Y(g)$ slightly increases according to the raise of altitude. In such case, compensation may be made approximately by varying the values of $\theta_A$ and $\theta_D$.

At the above-mentioned altitude, when an acceleration force $\alpha$ is exerted on the instrument in the $X_2$ direction, the weight 37 has a rotative force with respect to the point O as follows: when $\theta > \theta_A$, $M \cdot \alpha \cdot \sin(\theta-\theta_A)$ (counterclockwise); $\theta < \theta_A$, $M \cdot \alpha \cdot \sin(\theta_A-\theta)$ (clockwise).

The rotative force of the weight 39 with respect to the point O′ is as follows:
when $\theta > \theta_A$, $M \cdot a \cdot \sin(\theta - \theta_A)$ (counterclockwise)
$\theta < \theta_A$, $M \cdot a \cdot \sin(\theta_A - \theta)$ (clockwise).

Accordingly, the respective rotative forces are cancelled with each other with respect to the point O. A similar result is obtained when the acceceration force in the $X_1$ direction is exerted.

COMPENSATION OF THE X-DIRECTION

When the acceleration is exerted in the $X_2$ direction, the free ends of the capsules bend in the $X_1$ direction, and the gear accordingly moves counterclockwise, thus resulting in a wrong indication. Compensation of the X-direction according to the present invention is achieved by using the pair of weights B of 38 and 40. It is set that the point of mass of the weight 38 is at the distance $b$ from the point O, with an angle of $\theta_B$ with respect to the $Y_1$ axis, and that the center of mass of the weight 40 is at the distance $b$ from the point O'. Mass of these weights is set as $m$.

Figure 7:
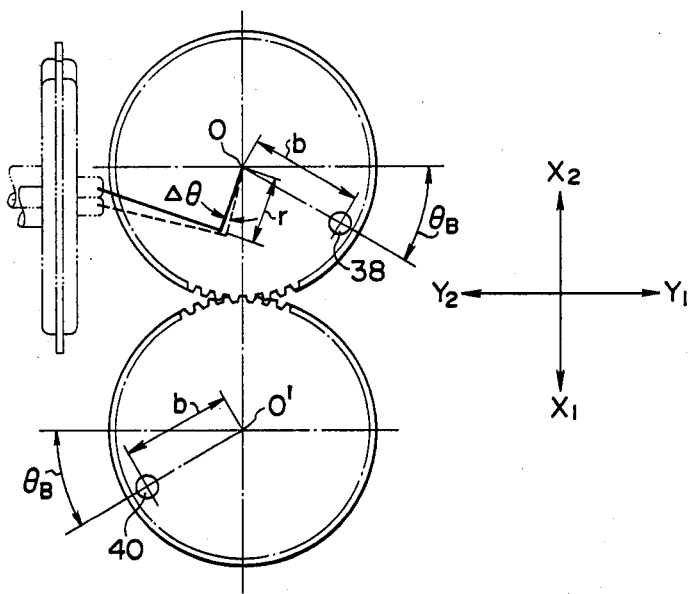
FIG. 7 is a view explaining the compensation in the X-direction by the present invention.

FIG. 7 is a view explaining an adjustment of the initial state wherein the acceleration direction of gravity is the $X_1$ direction; the altitude is zero; and the atmospheric pressure is of standard level. It is made that under the initial state a force of $2b \cdot mg \cdot \cos \theta_B$ in the clockwise direction is urged toward the point O.

Under this initial state, when an acceleration force $a$ is exerted in the $Y_1$ direction, the weight 38 exerts a torque of $b \cdot m \cdot \theta \sin \theta_B$ in the clockwise direction with respect to the point O, and the weight 40 exerts that of $b \cdot m \cdot \theta \sin \theta_B$ in the clockwise direction with respect to the point O', namely in the counterclockwise direction with respect to the point O, thus giving no compensation against the acceleration force in the Y direction. This is same also when the acceleration is exerted in the $Y_2$ direction.

When an acceleration force $\theta$ is exerted at a certain altitude in the direction of axis $X_1$ or $X_2$, the free end of the capsules bend. When the altitude becomes larger, the amount of bend of the free end of the capsules varies with the change of the stiffness constant of the capsules and the movement of the free end of the capsules. Accordingly, in the compensation of the X direction the values of $m$, $\theta_B$ and $b$ must be set in view of these factors.

Compensation moment of bend when the acceleration force $a$ in the X-direction is exerted at a certain altitude is given it the following equation:

$$2b \cdot m \cdot a \cos (\theta_B - \theta) \quad (4)$$

At a certain altitude the moment generated by the Y-direction acceleration to the pair of weights B of 38 and 40 is cancelled and there will be no influence in the Y-direction.

The weights used in the instrument according to the present invention are disposed as above described, and therefore when the initial state is set and adjusted in the above mentioned relation both in the directions of X and Y using the acceleration of gravity, compensation against other influence of the acceleration force may well be achieved.

Compensation of acceleration in the Y-direction may be made even when the g in the equation (2) is changed to any value to the extent that the equation is satisfied.

Compensation of acceleration in the X-direction becomes better according to the increase of the acceleration $a$ as is shown in the equation (4).

Since the compensation may be made independently in the X- and Y-directions, any desirable compensation is possible according to the characteristics of the capsules and adjustment becomes easy. In other words, easy adjustment is possible to the skill in the art by selecting any distance of the weights from the respective centers and any mass of the weights with respect to the respective directions.

The adjustment in the case of negative weights may be made similarly. In such case, adjustment is made by selecting distances from the center of the gears and the diameters of the openings.

Any further changes and modifications may be made without departing from the scope of the invention. Further, the mechanism according to the present invention may be used not only in the altitudes but also in other aircraft instruments such as speedometers, indicating instruments using pointers, or aircraft instruments using limit switches. Reference is therefore to be had to the appended claims for a definition of the limits of the invention.

What is claimed is:

1. An aircraft instrument with an acceleration compensation device comprising: at least one capsule, a rocking axle, a link mechanism to transmit displacements of a free end of the capsule to the rocking axle, a first gear integrally provided with the rocking axle, a second gear meshed with the first gear and being rotatable, and weights provided on the first and the second gears so as to displace the centers of mass of the gears radially from the respective rotation axes, the relative masses and positions of said weights being such that the rotative force of the weights caused by an acceleration force works on the rocking axle so as to cancel the rotative force of the rocking axle by the displacements, due to the acceleration, of the free end of the capsule.

2. An aircraft instrument according to claim 1, wherein the weights comprise a first pair of weights respectively provided on the first and second gears so as to cancel displacements of the free end of the capsule generated from the acceleration force in a first axial direction which is parallel to the axis of the capsule, and a second pair of weights respectively provided on the first and second gears so as to cancel displacements of the free end of the capsule in a second axial direction which is at right angles with respect to the first axial direction.

3. An aircraft instrument according to claim 2, wherein a moment of the first pair of weights against the rotative center of the first gear, generated by the acceleration force in the second axial direction is adjusted to zero.

4. An aircraft instrument according to claim 2, wherein a moment of the second pair of weights against the rotative center of the first gear generated by the acceleration force in the first axial direction is adjusted to zero.

5. An aircraft instrument according to claim 2, wherein the first and the second gears are of same diameter.

6. An aircraft instrument according to claim 1, wherein said first and second gears are provided, respectively, with a first and second pair of weights whereby the second gear is urged to rotate to one direction so that the free gear meshed with the second gear rotates followingly with the movement of the free end of the capsule through the link mechanism.

7. An aircraft instrument according to claim 1 wherein the instrument is an altimeter.

8. An aircraft instrument with an acceleration compensation device comprising: at least one capsule, a rocking axle, a link mechanism to transmit displacements of a free end of the capsule to the rocking axle, a first gear integrally provided with the rocking axle, a second gear meshed with the first gear and being rotatable, and openings provided in the first and the second gears so as to displace the centers of mass of the gears radially from the respective rotation axes, the relative sizes and positions of said openings being such that the rotative force of said openings caused by an acceleration force works on the rocking axle so as to cancel the rotative force of the rocking axle by the displacements, due to the acceleration of the free end of the capsule.

* * * * *